(12) United States Patent
Smith (10) Patent No.: US 7,083,716 B2
(45) Date of Patent: Aug. 1, 2006

(54) AIR ACTIVATED DECANTER

(75) Inventor: David Smith, Beloit, WI (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 0 days.

(21) Appl. No.: 10/940,807

(22) Filed: Sep. 13, 2004

(65) Prior Publication Data

US 2006/0054548 A1 Mar. 16, 2006

(51) Int. Cl.
*B01D 21/24* (2006.01)

(52) U.S. Cl. .............. 210/122; 210/242.1; 210/540
(58) Field of Classification Search ............. 210/122, 210/242.1, 242.3, 540, 776
See application file for complete search history.

(56) References Cited

U.S. PATENT DOCUMENTS

| | | | | |
|---|---|---|---|---|
| 3,303,932 A | * | 2/1967 | Hirs et al. | 210/242.1 |
| 3,402,817 A | * | 9/1968 | Dovel | 210/242.1 |
| 3,568,836 A | * | 3/1971 | Ray | 210/242.1 |
| 4,695,376 A | | 9/1987 | Astrom | |
| 4,883,602 A | | 11/1989 | Anderson | |
| 5,104,528 A | | 4/1992 | Christie | |
| 5,358,644 A | | 10/1994 | Dennis | |
| 6,406,624 B1 | * | 6/2002 | DeVos | 210/242.1 |
| 6,743,358 B1 | * | 6/2004 | Lundbäck | 210/242.3 |
| 2003/0164325 A1 | * | 9/2003 | Gustafsson | 210/540 |
| 2004/0168967 A1 | * | 9/2004 | Thompson et al. | 210/242.1 |

* cited by examiner

*Primary Examiner*—Christopher Upton
(74) *Attorney, Agent, or Firm*—Niro, Scavone, Haller & Niro

(57) ABSTRACT

The present inventions provide a floating type decanter apparatus that controls the decanting operation through the use of air.

26 Claims, 9 Drawing Sheets

AIR ACTIVATED DECANTER

FIELD OF THE INVENTIONS

The present inventions relate generally to floating decanters for removing supernate from near the top of a liquid surface. More particularly, the present inventions relate to floating decanters that selectively perform the decanting operation through the use of air.

BACKGROUND OF THE INVENTIONS

Decanters are well known, particularly in the water and wastewater treatment industry. In wastewater treatment, for example, decanters are often used to remove the clarified liquid above the settled solids in a sequencing batch reactor treatment process. In general, there are fixed and floating type decanters. Examples of floating decanters are described and referenced in U.S. Pat. Nos. 4,695,376 and 5,104,528. Some such decanters require mechanical, electromechanical or pneumatic actuators to start and/or stop the decanting operation. Other floating decanters, such as those taught in U.S. Pat. No. 5,358,644 require, among other things, the priming or filling of the decanter line assembly to initiate the decanting operation. A representative example of known fixed decanters are described and referenced in U.S. Pat. No. 4,883,602.

SUMMARY OF THE INVENTIONS

The present inventions provide novel and effective floating decanting assemblies and devices that can be used in a variety of applications, while at the same time preserving the advantages of known decanters.

Accordingly, an object of the present invention is to provide a floating decanter that is activated by air (or other gas) and does not require mechanical actuation or priming the decant line.

Another object of the present invention is to provide an air operated decanter that requires little or no service or maintenance within the decant basin.

Still another object of the present invention is to provide an air activated floating decanter that is of a relatively low profile and/or can be used in covered and uncovered environments, including explosive and/or hazardous applications.

A further object of the present invention is to provide an air decanter that effectively removes supernate and prevents the flow of scum or other surface debris from entering the decanting operation.

Still another object of the present invention is to provide a floating decanter that selectively conducts the decant operation using relatively low pressure air (or other gas) from a wide variety of available sources.

Accordingly, the present invention provides a floating decanter for selectively performing the decanting operation in a decant basin and discharging supernate through a decant line assembly, having an upper portion including at least one float, a guide and a stop; a lower portion including a decant pan forming a buoyancy chamber, the decant pan operatively coupled to said upper portion; a discharge opening on the decant pan in fluid communication with the decant line assembly; and, an air line in communication with the buoyancy chamber for permitting the selective activation or deactivation of the decanting operation through the controlled evacuation or introduction of air into the buoyancy chamber. The present invention may also include a trap on the air line to prevent the introduction of water; a recess on the lower side of the float that is sized to permit the exterior upper surface of the decant pan to extend into the recess on the float when no decanting operation is being conducted; at least one ballast weight on the decant pan; and, a main air (or other gas) supply line in fluid communication with the air line that is connected to a low pressure air supply source.

Also according to the present invention, a floating decanter assembly to selectively permit the decanting operation in a decant basin is provided, having at least one float with a lower surface; a decant pan having an upper exterior surface capable of engaging the lower surface of the float and operatively coupled to the float to be capable of separating from the lower surface of the float a predetermined distance; a buoyancy chamber formed on a lower surface of the decant pan; a decant line assembly; an air line in communication with the buoyancy chamber; a discharge opening on the decant pan in communication with the decant line assembly; and, a main air supply assembly in communication with the air line.

And, the present invention provides a floating decanter assembly for performing decanting operations in a decant basin, the assembly having an upper portion including a float; a lower portion including a decant pan forming a buoyancy chamber and a discharge opening; a decant line assembly in communication with the discharge opening; and, an air supply means for selectively evacuating or introducing air in the buoyancy chamber for controlling the activation or deactivation of the decanting operation. A means for operatively coupling the upper portion to the lower portion is also provided.

Definition of the Terms

The following terms which may be used in the various claims and/or specification of this patent are intended to have their broadest meaning consistent with the requirements of law:

Decant basin: The liquid retaining receptacle for performing the decanting operation that may include open or covered basins, tanks, ponds or lagoons.

Decanting operation: The selective removal of supernatant or other separated fluid from near the top of a liquid surface in a decant basin and transferring it as effluent to some other location.

Float: The component(s) that maintains a degree of positive buoyancy of the decanter assembly in the decant basin during various phases of the decanting operation. The float may be in the form of an annulus having a variety of shapes and which may be constructed of metal, stainless steel, fiberglass, plastic and the like.

Decant line assembly: The piping, connectors, valves and other components that receive the supernatant or decanted liquid during the decanting operation and remove the decanted liquid effluent from the decant basin. The decant line is typically constructed from flexible pipe and/or couplings of any suitable material so that the line may move as part of the decanter assembly to accommodate changing liquid levels in the decant basin.

Decanter assembly: The components within the decant basin that are used to perform the decanting operation and which is in communication with the decant line assembly.

Where alternative meanings are possible, in either the specification or claims, the broadest meaning is intended. All words used in the claims are intended to be used in the normal, customary usage of grammar, the trade and the English language.

BRIEF DESCRIPTION OF THE DRAWINGS

The above described objects, features and advantages, as well as other features and advantages, of the present inventions (sometimes used in the singular, but not excluding the plural) will become apparent by reference to the specification and drawings; wherein like reference numbers are used for like elements among the several views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the preferred embodiments are contemplated. Any alternatives or modifications which make insubstantial changes in function, purpose, structure, use or result are intended to be covered by the claims of this patent.

A decanter assembly 10 of the present invention may be used in a decant basin 12, such as a tank, having side walls 14 (see e.g., FIGS. 5–8). The decant basin 12 has a water level 16 that changes throughout the decanting operation. Decanter assembly 10 generally includes an upper portion 20 and a lower portion 30. The decanter assembly 10 may be moored within decant basin 12 by a variety of mooring means well known to those of skill in the art. For example, mooring posts 15 may be provided within basin 12. Mooring posts 15 may be slidingly engaged by mooring guides 17 which may be attached to upper portion 20 (see e.g., FIGS. 5–9).

Figure 2:
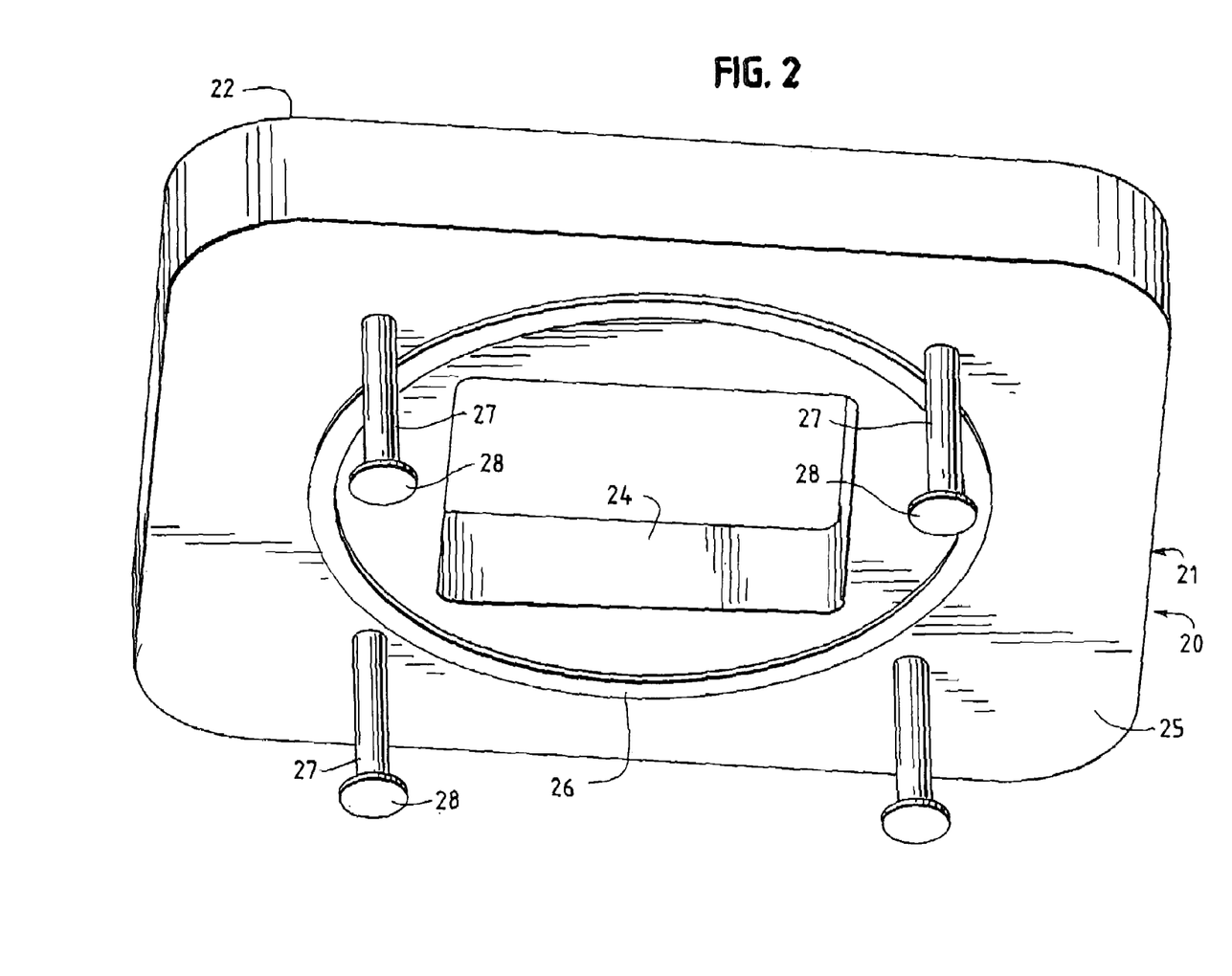
FIG. 2 is a bottom perspective view of an upper portion of a decanter assembly of the present invention.

As seen by reference to FIG. 2, upper portion 20 includes a float 21. Float 21 may be in the form of an annulus having an upper annular surface 22, an outer side surface 23, an inner side surface 24 and a lower annular surface 25. In a preferred embodiment, lower annular surface 25 is provided with a recess 26, the shape of which corresponds to the shape of the exterior upper surface 34 of decant pan 32, as hereinafter described. Lower surface 25 of float 21 is also provided with guides 27 having stops 28. The guides 27 and stops 28 are used to be slidingly engaged by and align lower portion 30 to upper portion 20. In addition, guides 27 and stops 28 limit the amount of separation or gap 29 (FIGS. 7 and 8) between float 21 and decant pan 32, as hereinafter described. Upper portion 20 may, if desired, be provided with a removable lid or cover 19 that, as shown in FIGS. 5–9, may be placed on upper surface 22 of float 21.

Figure 1:
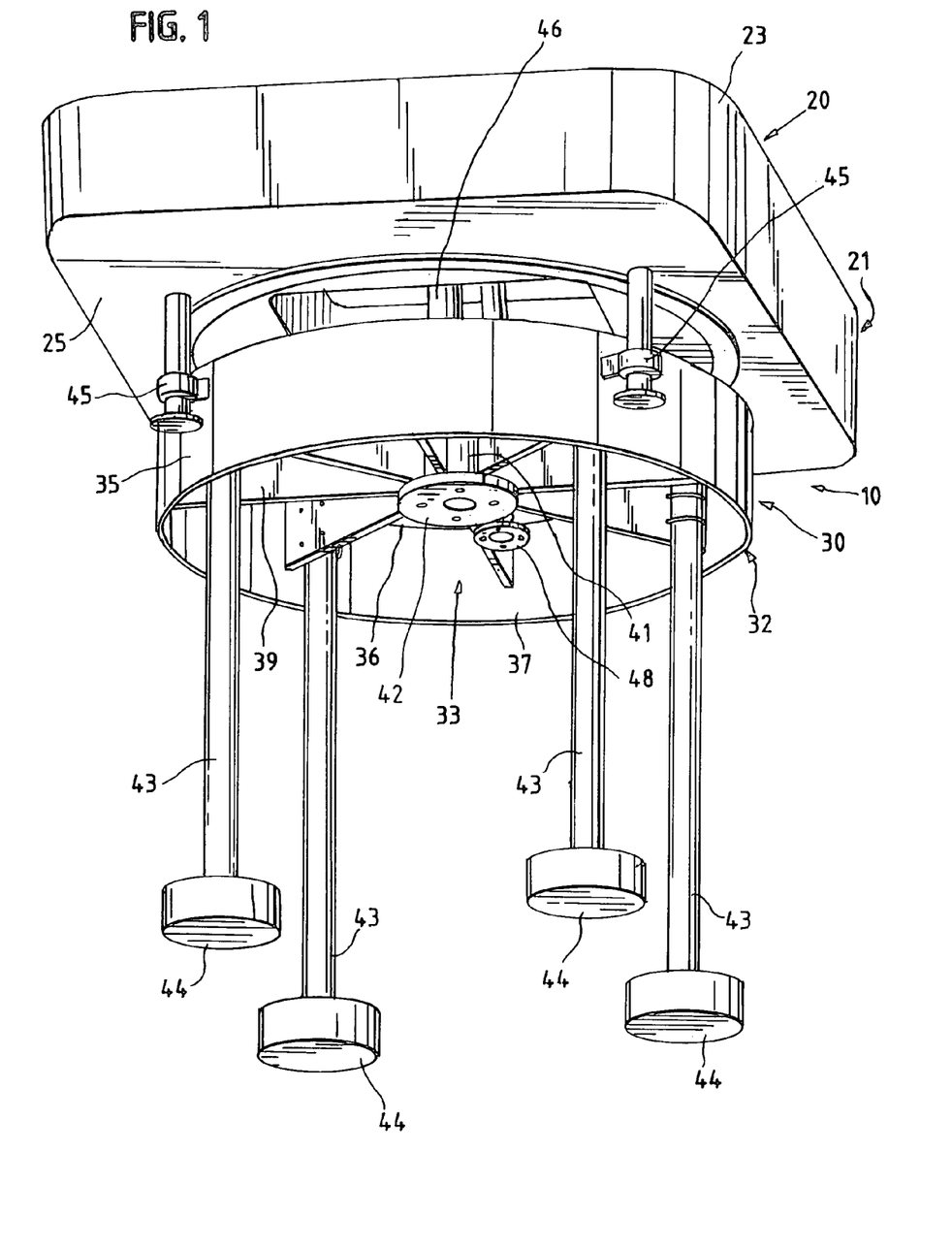
FIG. 1 is a bottom perspective view of a decanter assembly of the present invention.
Figure 3:
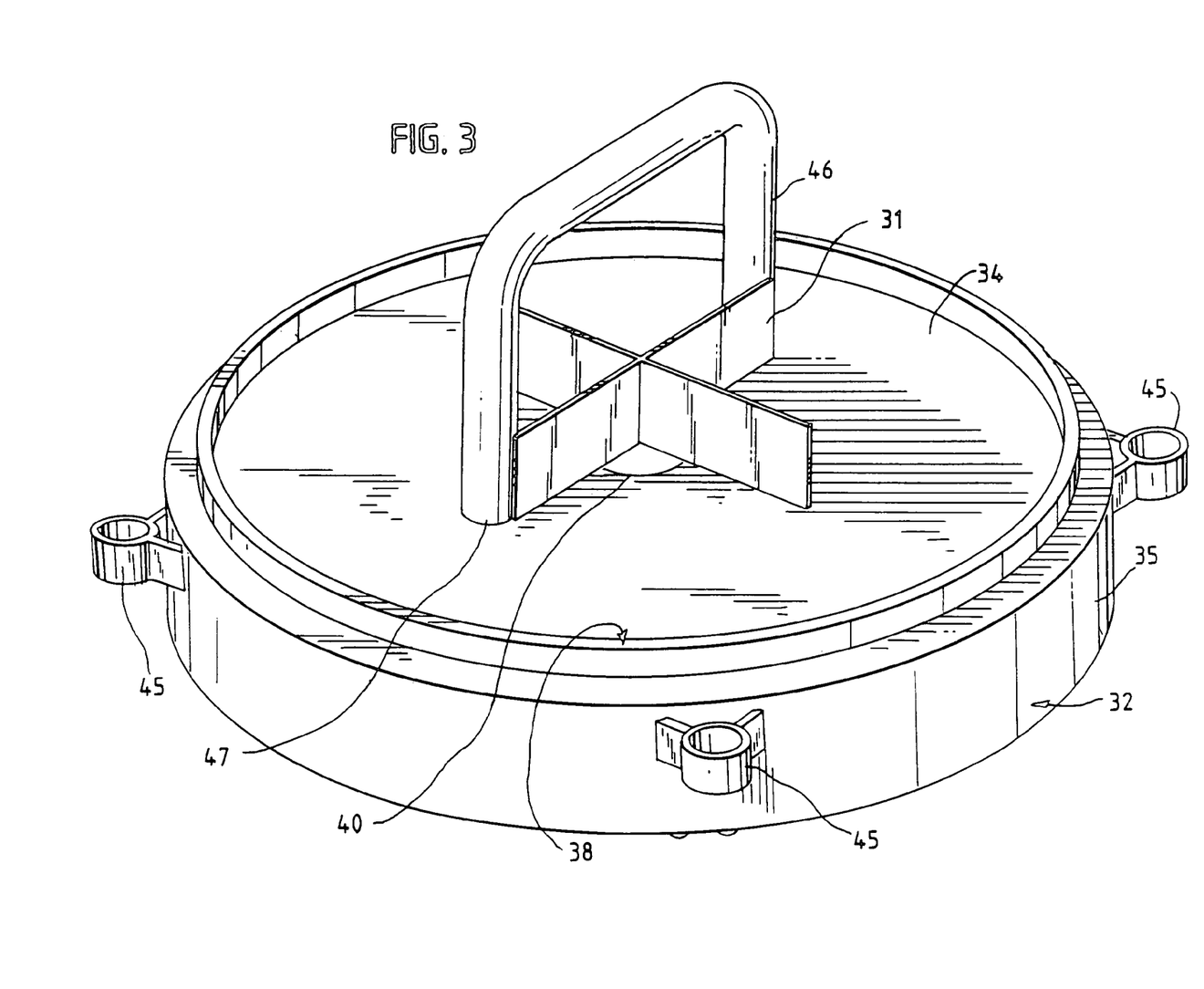
FIG. 3 is a top perspective view of a decant pan and other components of the present invention.
Figure 4:
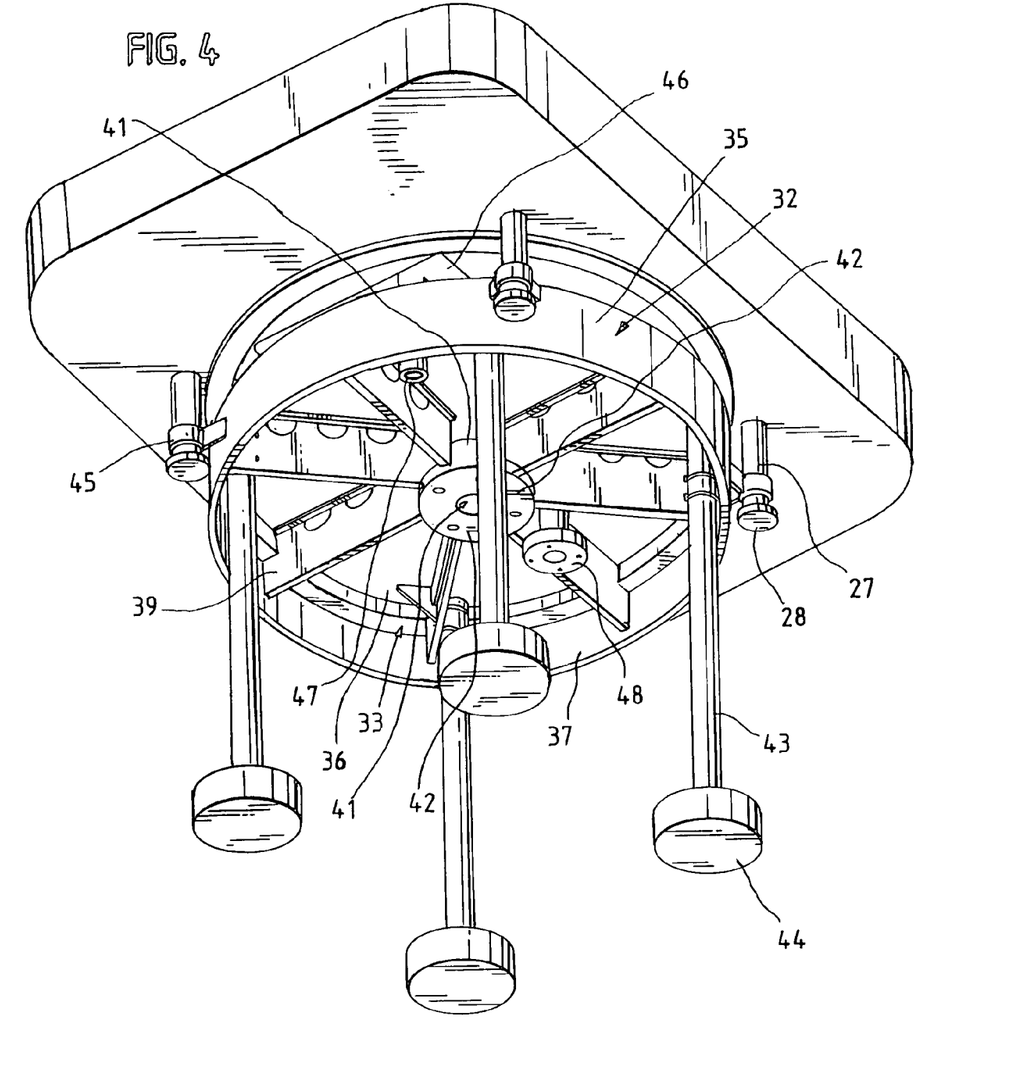
FIG. 4 is a bottom perspective view of a decanter assembly of the present invention which is similar to the view of FIG. 1.

The principal components of lower portion 30 of decanter assembly 10 may be best seen by reference to FIGS. 1, 3 and 4. Lower portion 30 includes a decant pan 32 which is in fluid communication with a decant line assembly 50 shown in FIGS. 5–9. In a preferred embodiment, decant pan 32 includes an exterior upper surface 34 and an exterior side surface 35. Decant pan 32 also includes an interior upper surface 36 and an interior side surface 37. These surfaces are assembled to form a buoyancy chamber 33 on the underside of decant pan 32 that enables the selective control of the decanting operation by adding air (or other gas) to or evacuating air (or other gas) from buoyancy chamber 33, as hereinafter described. Decant pan 32 is shown as having a circular footprint when viewed from above or below. However, any shape/footprint, such as a square or rectangle, may be used as long as sufficient buoyancy may be maintained in the buoyancy chamber 33 created by decant pan 32, as hereinafter described. A lip 38 (FIG. 3) is provided on exterior upper surface 34 of decant pan 32 to engage recess 26 of float 21 when no decanting operation is being conducted, as hereinafter described. Lip 38 also functions as a weir and may also be configured to help control the flow over exterior upper surface 34.

A discharge opening 40 is provided on decant pan 32 between the exterior upper surface 34 and the interior upper surface 36 (FIG. 3) that conveys the flow of decant liquid to decant line assembly 50. Discharge opening 40 is sealingly coupled to a discharge pipe 41 that includes a flange 42 which in turn is flexibly coupled to decant line assembly 50. A baffle, weir or other flow control mechanism 31 may be provided on exterior upper surface 34 that cooperates with discharge opening 40 to prevent vortices and the like during the decanting operation. A series of ribs 39 may be provided in buoyancy chamber 33 to help strengthen and support the decant pan 32, discharge pipe 41 and other components. And, as discussed below, buoyancy chamber 33 may be divided into a number of individual chambers depending upon the application.

Although a variety of other forms may be employed, decant pan 32 is also provided with legs 43 and ballast weights 44. The legs 43 and associated ballast 44 are sized to counteract the buoyancy of lower portion 30, as hereinafter described. Legs 43 may also function as a stand for decant assembly 10 when the water level 16 in tank 12 is in its lowest position. Alternatively, and as will be understood by those of skill in the art, legs 43 may interact with a shelf 11 of a dewatering stand assembly 13 (FIGS. 5–8) during the dewatering process (not shown). Sleeves 45 are also provided on decant pan 32 that slidingly engage guides 27 and cooperate with stops 28 of upper portion 20.

An air line 46 is also provided on decant pan 32. One end of the air line 46 has an inlet 47 that communicates with buoyancy chamber 33 and the other end has a connecting flange manifold 48 that provides a means to connect air line 46 to a main air supply line 49 (see e.g., FIG. 4). The main air supply line 49 may run parallel or be attached to decant line assembly 50. Main air supply line 49 is connected to pumps, valves and compressors (not shown) so that air may be selectively supplied to or evacuated from buoyancy chamber 33 via inlet 47. In a preferred embodiment, air supply line 46 extends above the exterior upper surface 38 of decant pan 32 and through the annular opening of float 21 (FIGS. 1 and 3). This trap or elbow is provided to ensure that air line 46 is kept above water level 16 at all stages of the decanting operation so that it will not fill with water.

Having described the major components of a preferred embodiment of the decanter assembly 10 of the present invention, its operation during the typical decanting operation may be understood by reference to FIGS. 5–8.

Figure 5:
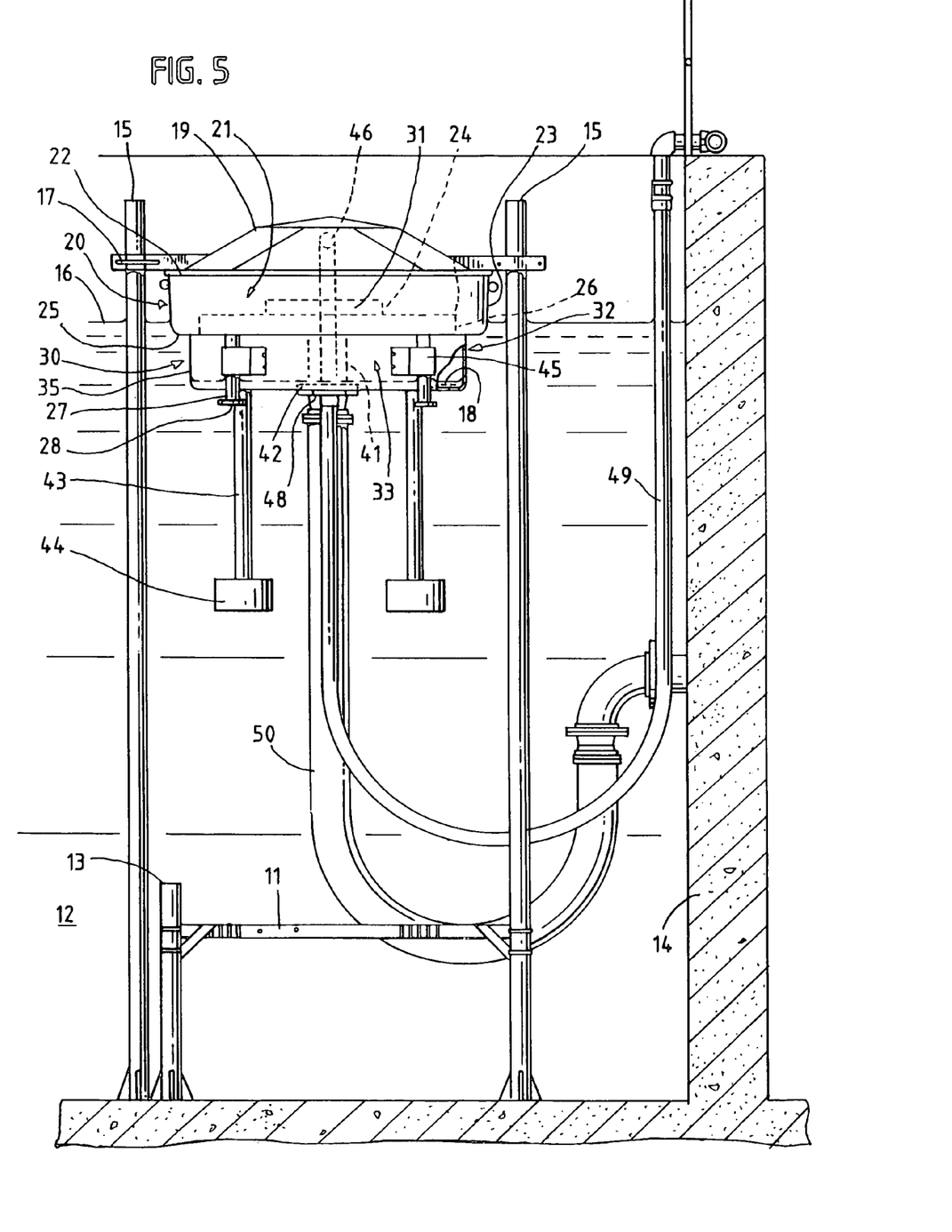
FIG. 5 is a sectional view of a decanter apparatus of the present invention shown in a closed or inactive state.

FIG. 5 shows the present invention in an inactive state where there is no decanting operation taking place. When in this state, buoyancy chamber 33 is substantially filled with air, displacing the water that would otherwise be in the buoyancy chamber 33 and providing buoyancy to decant pan 32. Thus, the chamber water level 18 is roughly as shown in FIG. 5. Additional buoyancy is also provided to lower portion 30 from the empty decant line assembly 50. This cumulative buoyancy is sufficient to overcome the weight of the lower portion 30, including the legs 43 and weight 44. At this phase, the buoyancy of the lower portion 30 is also sufficient to overcome some or all of the weight of upper portion 20. Consequently, the exterior upper surface 34 of decant pan 32 extends into the recess 26 on lower annular surface 25 and is above water level 16. In addition and depending upon the application, the lower annular surface 25 of float 21 may also be slightly above water level 16 (not shown) at the closed or non-decant phase. Accordingly, flow through discharge opening 40 is prohibited. In addition, because the lip 38 on the exterior upper surface 34 is above water level 16, there is no need for a watertight seal between the exterior upper surface 34 of the decant pan 32 and lower annular surface 25 and/or recess 26 of float 21.

Figure 6:
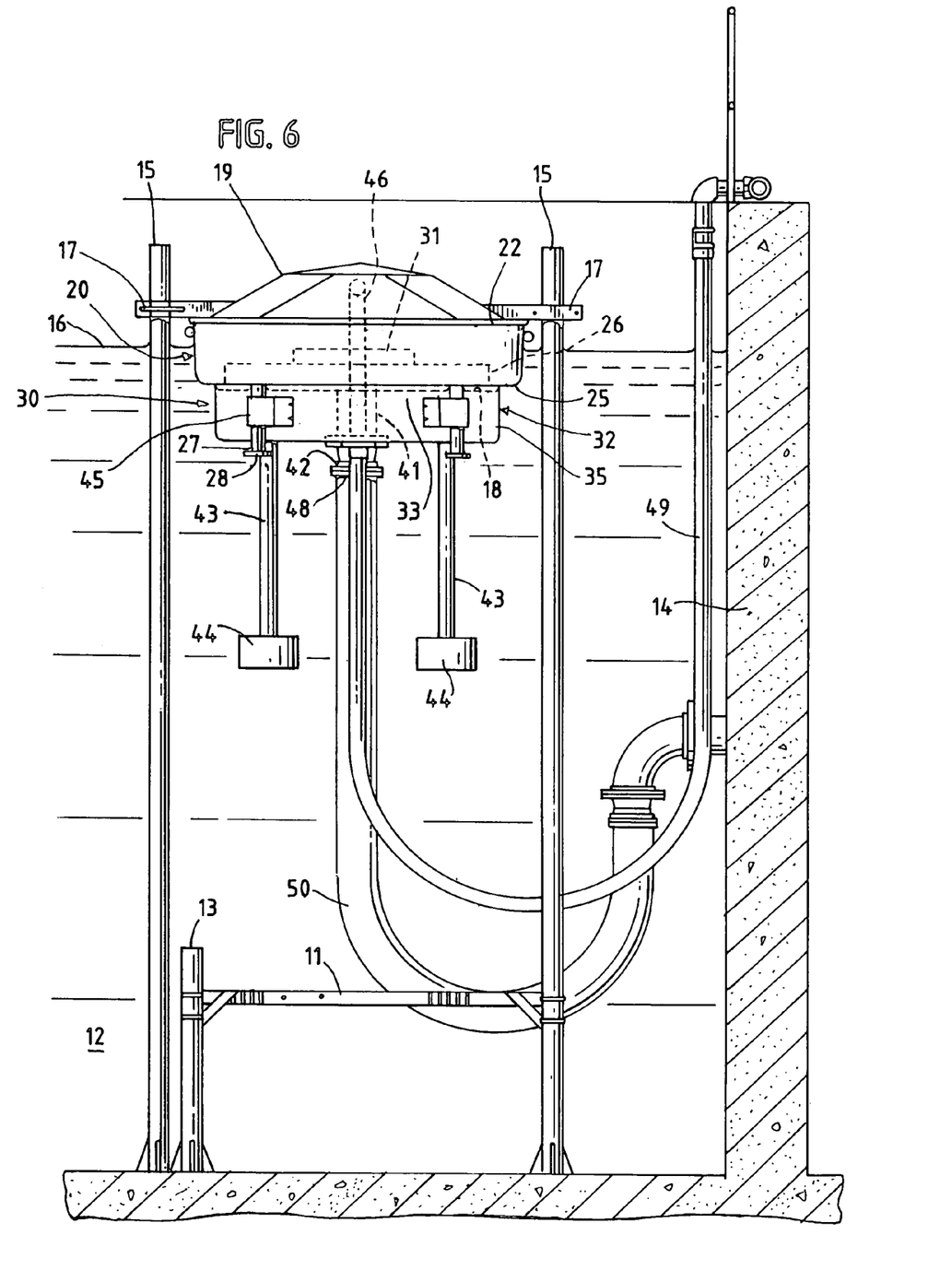
FIG. 6 is a sectional view of the decanter apparatus of FIG. 5 shown in a position at the initiation of the decanting operation.
Figure 7:
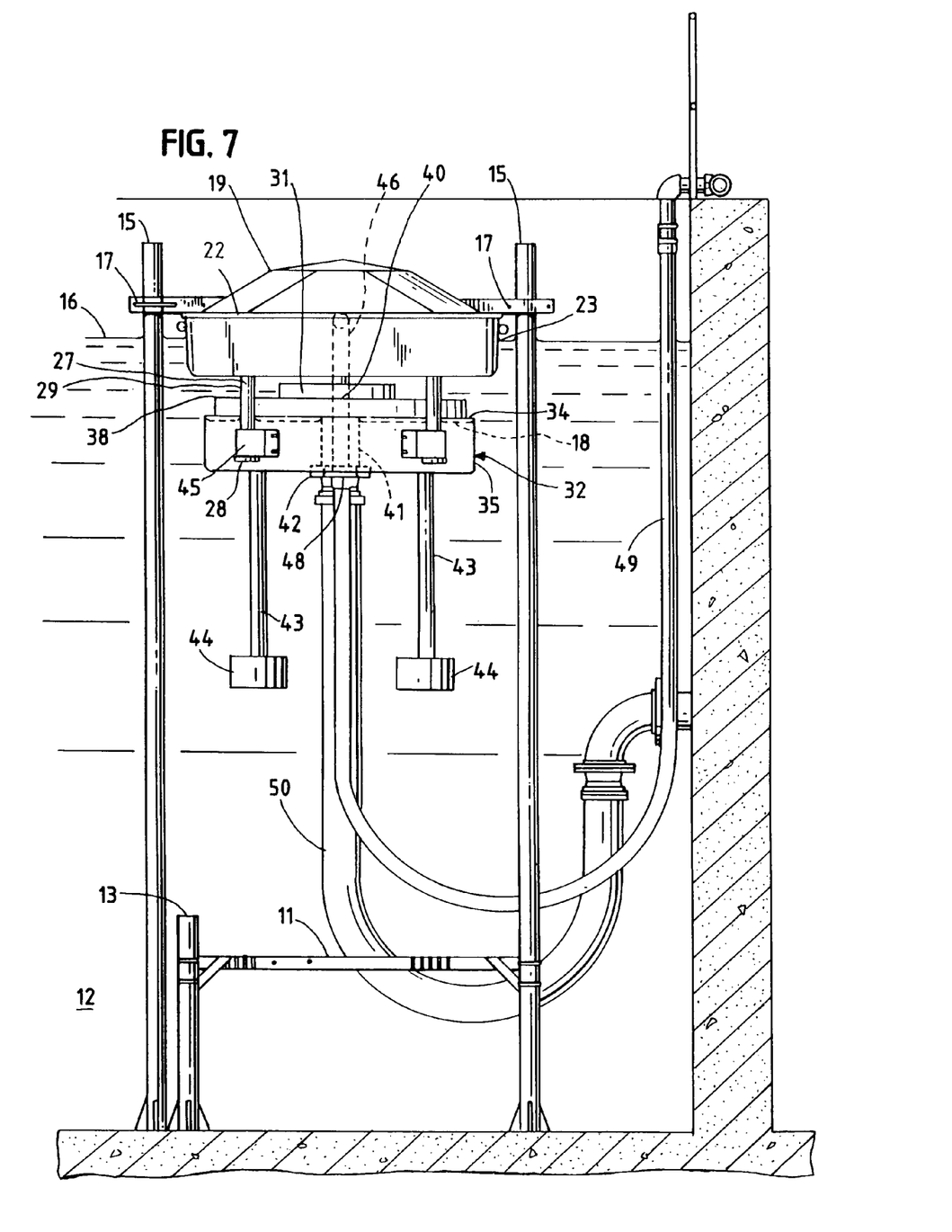
FIG. 7 is a sectional view of the decanter apparatus of FIG. 5 shown in a position during full decanting operation.
Figure 8:
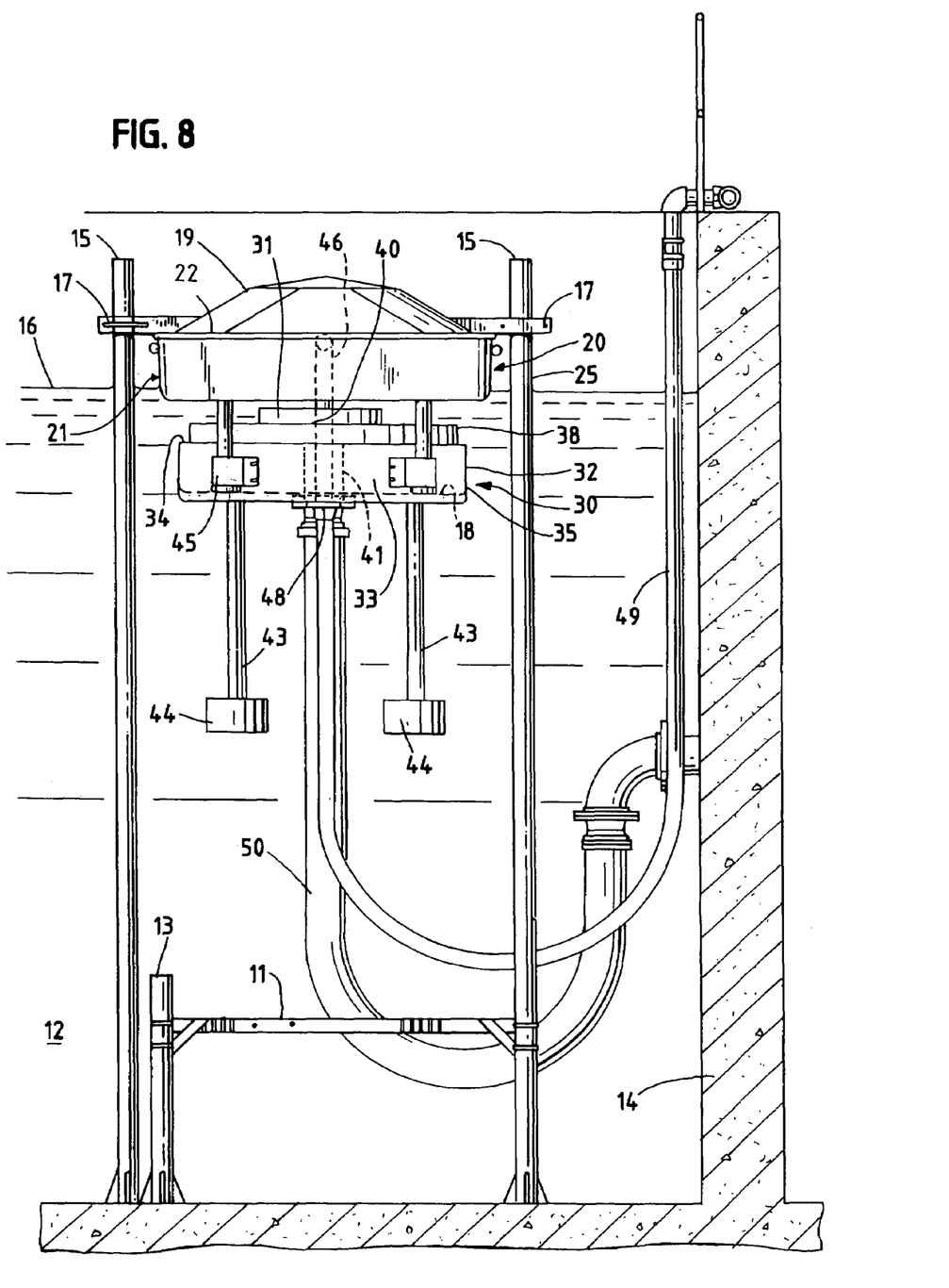
FIG. 8 is a sectional view of the decanter apparatus of FIG. 5 shown in a position at the stopping of the decanting operation.
Figure 9:
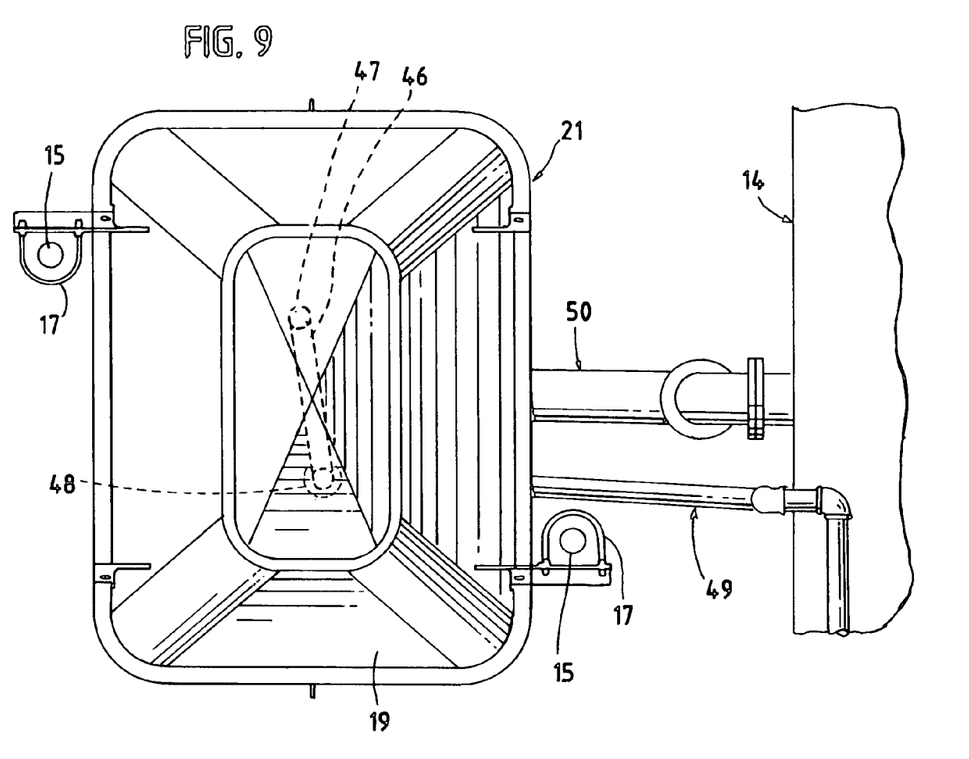
FIG. 9 is a top plan view of the decanter apparatus of FIG. 5.

FIG. 6 shows the present invention at the initiation of the decant operation. Specifically, when decanting is desired, air from the buoyancy chamber 33 is evacuated via inlet 47 of air line 46 and vented out of the system through main air supply line 49 and its associated valves, fittings and the like (not shown). As a result, chamber water level 18 raises by gravity and displaces the air formerly in buoyancy chamber 33. This displacement results in loss of buoyancy of lower portion 30 and the weight of the lower portion 30 overcomes the buoyancy of the empty decant line assembly 50. As the air in buoyancy chamber 33 is displaced by water, as shown in FIG. 6, upper portion 20 begins to sink lower into the water. Eventually, the loss of buoyancy will result in the separation of upper portion 20 and lower portion 30 (i.e., creating gap 29 as shown in FIGS. 7 and 8), allowing decant pan 32 to sink below water level 16. Water flowing over the lip 38 and into discharge opening 40 begins filling the decant line assembly 50, further reducing buoyancy of lower portion 30.

Lower portion 30 would continue to sink as a result of the lost buoyancy. However, the sinking of lower portion 30 is limited a predetermined amount by the stops 28 on guides 27 of upper portion 20. When sleeves 45 on decant pan 32 engage stops 28, lower portion 30 begins to drag upper portion 20 down into the water and a lower portion of float 21 below water level 16. At this point, the buoyancy of float 21 is sufficient to overcome the weight of lower portion 30 when in the full stage of the decanting operation, as shown in FIG. 7.

To stop the decanting operation, air is introduced into buoyancy chamber 33 via inlet 47. Like the reverse of initiation of the decanting operation, when ceasing the decanting operation, the introduced air displaces the water in chamber 33, lowers chamber water level 18 and adds buoyancy to lower portion 30 as shown in FIG. 8. This added buoyancy is sufficient to overcome the weight of lower portion 30 and the weight of now full decant line assembly 50. As a result, lower portion 30 begins to rise, eventually bringing lip 38 and upper surface 34 of decant pan 32 out of the water and into engagement with float 21, as shown in FIG. 5, and stopping the decanting operation.

As will be understood by those of skill in the art, particularly in light of the teachings of this patent, the ballast weights 44 or other methods of providing ballast, in conjunction with the weight of the other components of the lower portion 30, must be sufficient to overcome the buoyancy of the empty decant line assembly 50 when water is evacuated from buoyancy chamber 33 to initiate the decanting operation. In addition, it is preferred that the ballast weights 44 be positioned low and away from the vertical center line of the decanter assembly 10 to provide stability to the assembly 10. As previously discussed, legs 43 may also function as or cooperate with a dewatering stand 13 for the assembly 10 when the decant basin or tank 12 is being dewatered.

In addition, it will also be understood by those of skill in the art that buoyancy chamber 33 must be sufficiently large to displace enough water to compensate for the buoyancy lost and weight of a full decant line assembly 50. This enables lower portion 30 to regain positive buoyancy to stop the decanting process and empty the decant line assembly 50. In a simple embodiment, the decanter assembly 10 settles low enough in the basin or tank 12 that effluent flow rate is determined purely by head differential between the decanter assembly 10 and discharge elevation, as will be understood by those of ordinary skill in the art. In such applications, the decant line assembly 50 runs completely full and decant flow rate decreases as basin level 16 and driving head drop.

In an alternative embodiment of the present invention, it is also possible to exercise a higher degree of control over the rate of discharge of effluent from the decanter assembly 10 in situations where it is required. To control the rate of discharge, the ability to control the flow over the exterior upper surface 34 must be provided. Notably, until the decant line assembly 50 runs fully flooded, flow over lip 38 and the exterior upper surface 34 of decant pan 32 is a function of both surface perimeter of the upper surface 34 and degree of submergence of decant pan 32. If the surface perimeter component is of one elevation or flat (as shown), flow will vary essentially according to submergence to the (3/2) power. If the exterior upper surface 34 is notched (not shown), its perimeter surface area will vary with submergence, providing an added means to varying flow. In addition, since the submergence level remains a function of the overall assembly 10 buoyancy, it is also possible to form a partitioned buoyancy chamber 33 (not shown) such that the decant line assembly 50 does not run completely full (not shown). In this embodiment, additional air lines 46 are required to supply the individual buoyancy compartment(s) or individual chambers of decant pan 32 with air and to permit the evacuation of air.

Embodiments having increased control over discharge rate are particularly applicable when the duration of the decanting operation must be fixed regardless of decant effluent volume. In such situations, the "full flow" setting could be used initially, followed by a low flow period to stretch the decanting operation cycle to the required duration. Level sensors (not shown) within the basin 12 would allow an automatic controller to switch between the two settings as needed.

Moreover, as will be appreciated, once the decanting operation is initiated, it will continue until air is introduced into the buoyancy chamber 33. Under typical circumstances, air may be supplied by blowers (not shown) that are typically used for aeration during the operation of a sequencing batch reactor or otherwise available at the water or wastewater treatment facility. In the event of a blower failure or general power failure, a standby tank of compressed air, or other back-up means (not shown), could operate the system. Generally, any low pressure air source (for example, one that supplies air at pressure sufficient to displace the water in buoyancy chamber 33 during the decanting operation in order to stop the decanting operation) used in conjunction with manual override valves controlling the main air supply line may be used that would allow operation under any circumstances.

Further, it will be understood that the float 21 must provide sufficient buoyancy such that the sides 23 of the float 21 become partially submerged below water line 16 during the decanting operation, but at the same time, does not sink. The partial submergence of float 21 prevents scum or other floating debris from contaminating the decanted effluent during the decanting operation.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A floating decanter assembly for selectively performing a decanting operation in a decant basin and discharging supernate effluent through a decant line assembly, comprising:
    an upper portion including at least one float, a guide and a stop;
    a lower portion including a decant pan forming a buoyancy chamber, said decant pan operatively coupled to said upper portion;
    a discharge opening on said decant pan in fluid communication with the decant line assembly; and,
    an air line in communication with said buoyancy chamber of said decant pan for permitting the selective activation or deactivation of the decanting operation through the controlled evacuation or introduction of air into said buoyancy chamber.

2. The invention of claim 1 wherein said air line includes a trap to prevent the introduction of water into said air line.

3. The invention of claim 1 wherein said decant pan includes an upper exterior surface that provides the entry for the discharge opening.

4. The invention of claim 3 wherein said float includes a recess that is sized to permit the exterior upper surface of said decant pan to extend into said recess when no decanting operation is being conducted.

5. The invention of claim 4 wherein said upper exterior surface of said decant pan includes a lip.

6. The invention of claim 3 wherein said upper exterior surface is notched.

7. The invention of claim 6 wherein said buoyancy chamber includes more than one chamber, each chamber having an air line.

8. The invention of claim 1 wherein said decant pan includes at least one ballast weight.

9. The invention of claim 8 wherein said at least one ballast weight is attached to at least one leg on said decant pan.

10. The invention of claim 1 wherein said air line is in communication with a main air supply line that is connected to a low pressure air supply source.

11. The invention of claim 1 wherein said float is an annulus.

12. The invention of claim 1 wherein said operative coupling of said decant pan includes at least one sleeve to slidingly engage the guide and stop on said lower portion.

13. The invention of claim 1 wherein said buoyancy chamber includes more than one chamber, each chamber having an air line.

14. A floating decanter assembly to selectively permit a decanting operation in a decant basin, comprising:
    at least one float having a lower surface;
    a decant pan having an upper exterior surface capable of engaging the lower surface of said float and operatively coupled to said float to be capable of separating from said lower surface of said float;
    a buoyancy chamber formed on a lower surface of said decant pan;
    a decant line assembly;
    an air line in communication with said buoyancy chamber;
    a discharge opening on said decant pan in communication with said decant line assembly; and,
    a main air supply assembly in communication with said air line.

15. The invention of claim 14 wherein said float has an annular shape.

16. The invention of claim 14 wherein ballast weights are attached to said decant pan.

17. The invention of claim 14 wherein said float includes at least one guide and at least one stop.

18. The invention of claim 17 wherein said decant pan includes sleeves to slidably engage said at least one guide and stop.

19. The invention of claim 14 wherein said float includes a recess.

20. The invention of claim 14 wherein the upper surface of said decant pan includes a lip.

21. The invention of claim 14 wherein more than one buoyancy chambers are formed on a lower surface of the decant pan and each of said more than one buoyancy chambers has an air line in communication with said more than one buoyancy chambers.

22. The invention of claim 21 wherein the exterior upper surface is not on a single plane.

23. The invention of claim 22 wherein said exterior upper surface is notched.

24. A floating decanter assembly for performing a decanting operation in a decant basin, comprising:
    an upper portion including a float;
    a lower portion including a decant pan forming a buoyancy chamber and having a discharge opening;
    a decant line assembly in communication with said discharge opening; and,
    an air supply means for selectively evacuating or introducing air within said buoyancy chamber for controlling the activation or deactivation of the decanting operation.

25. The invention of claim 24 including means for operatively coupling said upper portion to said lower portion.

26. The invention of claim 24 where said lower portion includes ballast weights.

* * * * *